(12) United States Patent
Walsh et al.

(10) Patent No.: US 8,429,848 B2
(45) Date of Patent: Apr. 30, 2013

(54) MOLE TRAP

(75) Inventors: James R. Walsh, Wauwatosa, WI (US);
Paul R. Zeamer, Madison, WI (US);
Daniel C. Johnson, Madison, WI (US)

(73) Assignee: Bell Laboratories, Inc., Madison, WI (US)

( * ) Notice: Subject to any disclaimer, the term of this patent is extended or adjusted under 35 U.S.C. 154(b) by 688 days.

(21) Appl. No.: 12/603,233

(22) Filed: Oct. 21, 2009

(65) Prior Publication Data
US 2011/0088308 A1 Apr. 21, 2011

(51) Int. Cl.
*A01M 23/26* (2006.01)
(52) U.S. Cl.
USPC .................................. 43/80; 43/88; 43/92
(58) Field of Classification Search ............... 455/406; 43/58, 77–81, 82, 88, 90, 92–94; *A01M 23/00, A01M 23/24, 23/26*
See application file for complete search history.

(56) References Cited

U.S. PATENT DOCUMENTS

| | | | | |
|---|---|---|---|---|
| 280,811 | A * | 7/1883 | Gilleland et al. | 43/94 |
| 1,296,407 | A * | 3/1919 | Layton | 43/88 |
| 2,525,383 | A * | 10/1950 | Troutman | 43/94 |
| 2,525,533 | A * | 10/1950 | Dunkelberger | 43/83.5 |
| 4,711,049 | A | 12/1987 | Kness | |
| 4,765,087 | A | 8/1988 | Holtgrefe, Sr. | |
| 5,307,587 | A | 5/1994 | Zeiger et al. | |
| 6,508,031 | B1 | 1/2003 | Johnson et al. | |
| 6,578,314 | B1 | 6/2003 | Schmidt | |
| 6,751,901 | B2 * | 6/2004 | Emond | 43/87 |
| 6,868,633 | B2 | 3/2005 | Schroedl | |
| 7,104,005 | B2 | 9/2006 | Holtgrefe, Sr. | |
| 7,204,053 | B1 | 4/2007 | Holtgrefe, Sr. | |

* cited by examiner

*Primary Examiner* — Darren W Ark
*Assistant Examiner* — Lisa Tsang
(74) *Attorney, Agent, or Firm* — Stiennon & Stiennon

(57) ABSTRACT

A mole trap has a tough plastic base with downwardly extending fixed blades. Movable plastic blades are pivotably connected to the base and urged into a sprung condition by springs. A two-segment lever extends between the base and a catch which is pivotably mounted to the base. A trigger extends through a central opening in the catch and has a post which protrudes beneath the catch where it can be actuated by the targeted mole. Operation of the trigger post causes the lever to release from its engagement with the catch so that the movable blades close on and strike the mole positioned beneath the trap. The trigger has a release tab extending from the lever, allowing convenient release from the set position, and an upwardly protruding set arm allowing trigger depression from a point exterior to the handle into its desired set configuration.

17 Claims, 4 Drawing Sheets

MOLE TRAP

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to animal traps in general, and more particularly to devices for entrapping moles.

Subterranean mammals such as the mole spend most of their time underground traversing a network of narrow diameter runways. Although some of these passageways are more distant from the surface, many are closely positioned beneath ground level. Formation of these runways thus results in the earth being disturbed upwardly which forms unsightly mounds. These pests are seldom seen aboveground, and thus control of moles requires bringing countermeasures to their subterranean domain.

Although various poisons and repellants may be employed, these bring with them the requirement to secure the substances against children, pets, and non-targeted species. An alternative is to employ mechanical traps to capture or kill the moles underground. The conventional scissors trap has metal blades which are inserted into the ground adjacent a runway. A downwardly extending trigger is dislodged by the mole's attempt to repair the disturbed runway, resulting in a powerful spring closing the scissors-like blade to strike the animal. Yet the force required to successfully operate such a trap results in a device which must be handled with great care to avoid inadvertent triggering. An effective trigger and catch mechanism has been developed for rodent traps, such as the ones shown in U.S. Pat. Nos. 6,508,031 and 4,711,049. Yet these mechanisms employ a trigger surface which is accessed from above, and do not have application in a subterranean application.

What is needed is an effective mechanical mole trap which can be set and released without requiring a user to handle the device.

SUMMARY OF THE INVENTION

The mole trap of the present invention is formed primarily of plastic components and is readily set and released without the use of the user's hands, and is thereby more approachable and less intimidating to use. The base has two spaced pointed fixed blades. Each fixed blade has a pivoting blade mounted in close proximity in a scissors arrangement. A catch is pivotably mounted about a first axis at a first end to the base. A lever has a first segment which is pivotably connected to a second segment. The first lever segment is pivotably mounted about a second axis to the base, and the second lever segment is pivotably connected to the pivoting blades. Two springs extend between the second lever segment and the base to urge the pivoting blades to close with the fixed blades. The catch has an upwardly projecting catch pawl on one end, and an upwardly projecting trip pawl on the other end. The two pawls are spaced from each other by two side members which extend in a first direction on either side of a central opening. A trigger is mounted to the base to pivot about a third axis positioned between the first axis and the second axis. A tab extends downwardly from the second lever segment and engages the catch pawl when the trap is set. The trigger has a post which extends through the catch and protrudes beneath the catch and beneath the base. When the post is displaced by the movement of a mole, for example in seeking to restore a caved in portion of the underground runway, the trigger pivots and causes the catch pawl to release the lever second segment, and the springs then cause the scissors blades to close on one another.

It is an object of the present invention to provide a mole trap which may be set and released from a set configuration without requiring the user to engage the trap by hand.

It is a further object of the present invention to provide a mole trap which has an effective trigger release mechanism.

It is also an object of the present invention to provide a mole trap which includes portions to assist the user in placing it above a targeted animal runway with an appropriate ground cavity to receive the trigger of the trap.

It is another object of the present invention to provide a mole trap which can be safely sprung without requiring any part of the user's body to come within the confines of the device's blades.

Further objects, features and advantages of the invention will be apparent from the following detailed description when taken in conjunction with the accompanying drawings.

DESCRIPTION OF THE PREFERRED EMBODIMENTS

Figure 1:
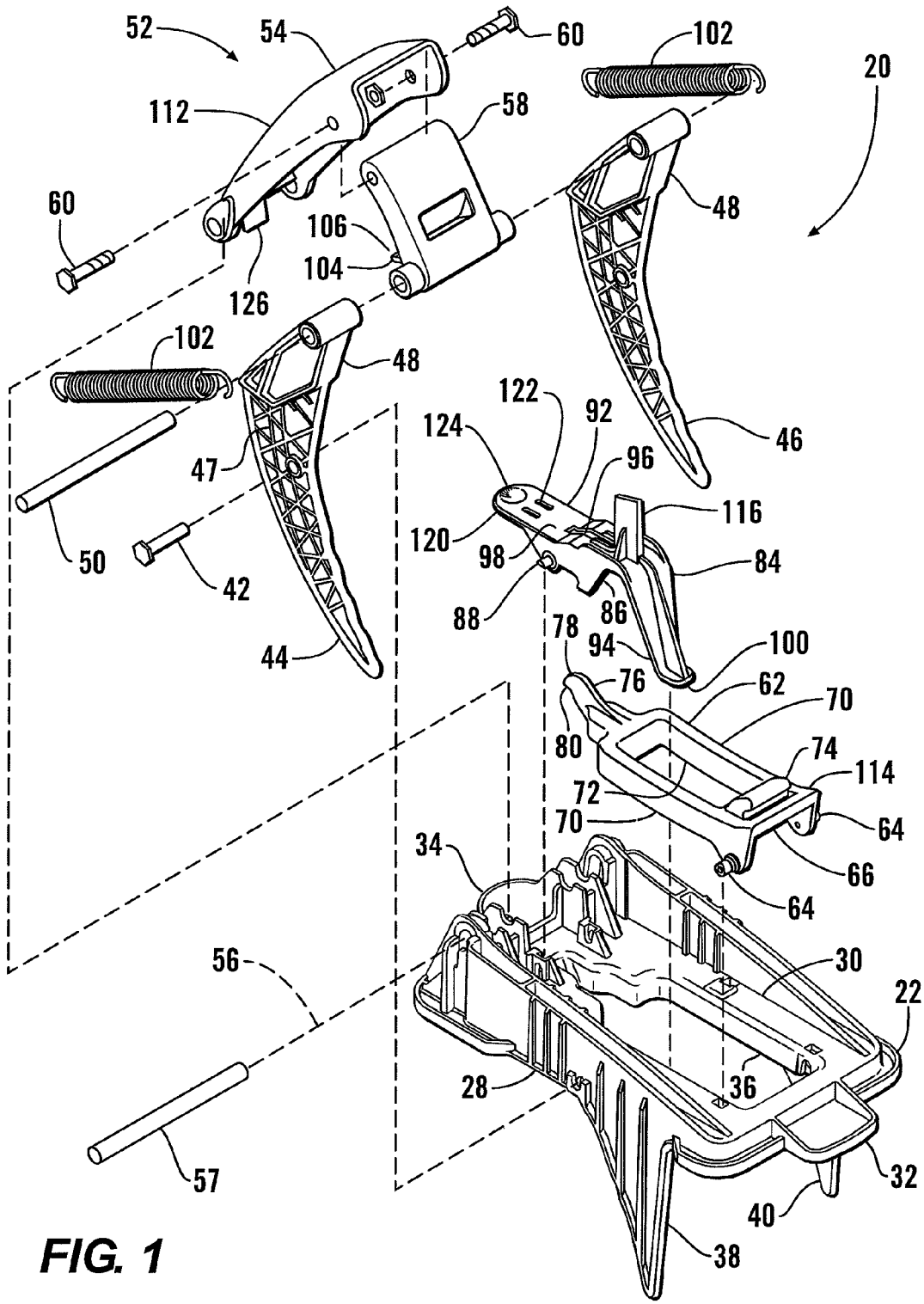
FIG. 1 is an exploded isometric view of the mole trap of this invention.
Figure 2:
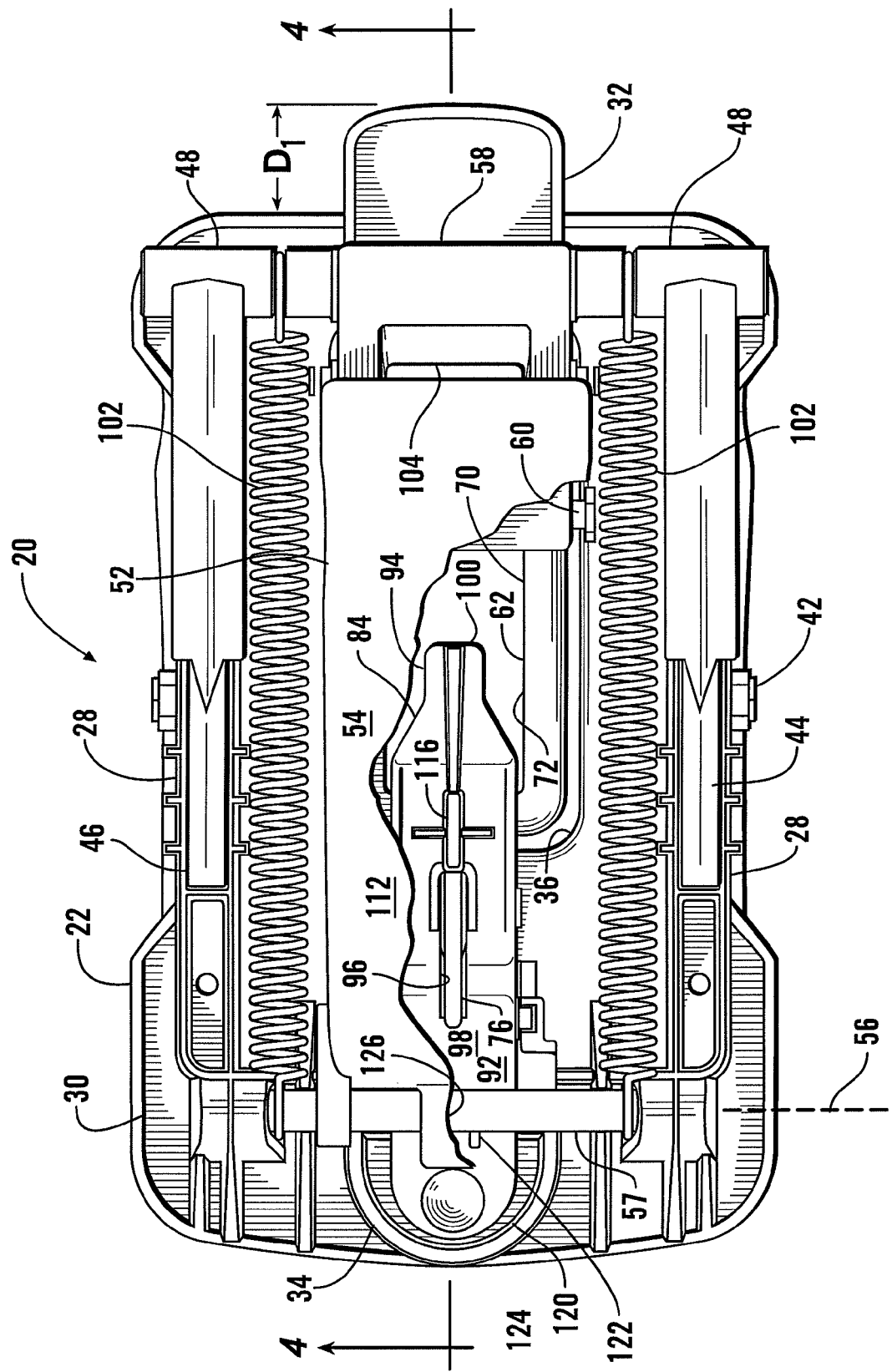
FIG. 2 is a top plan view of the mole trap of FIG. 1 in a set configuration.
Figure 3:
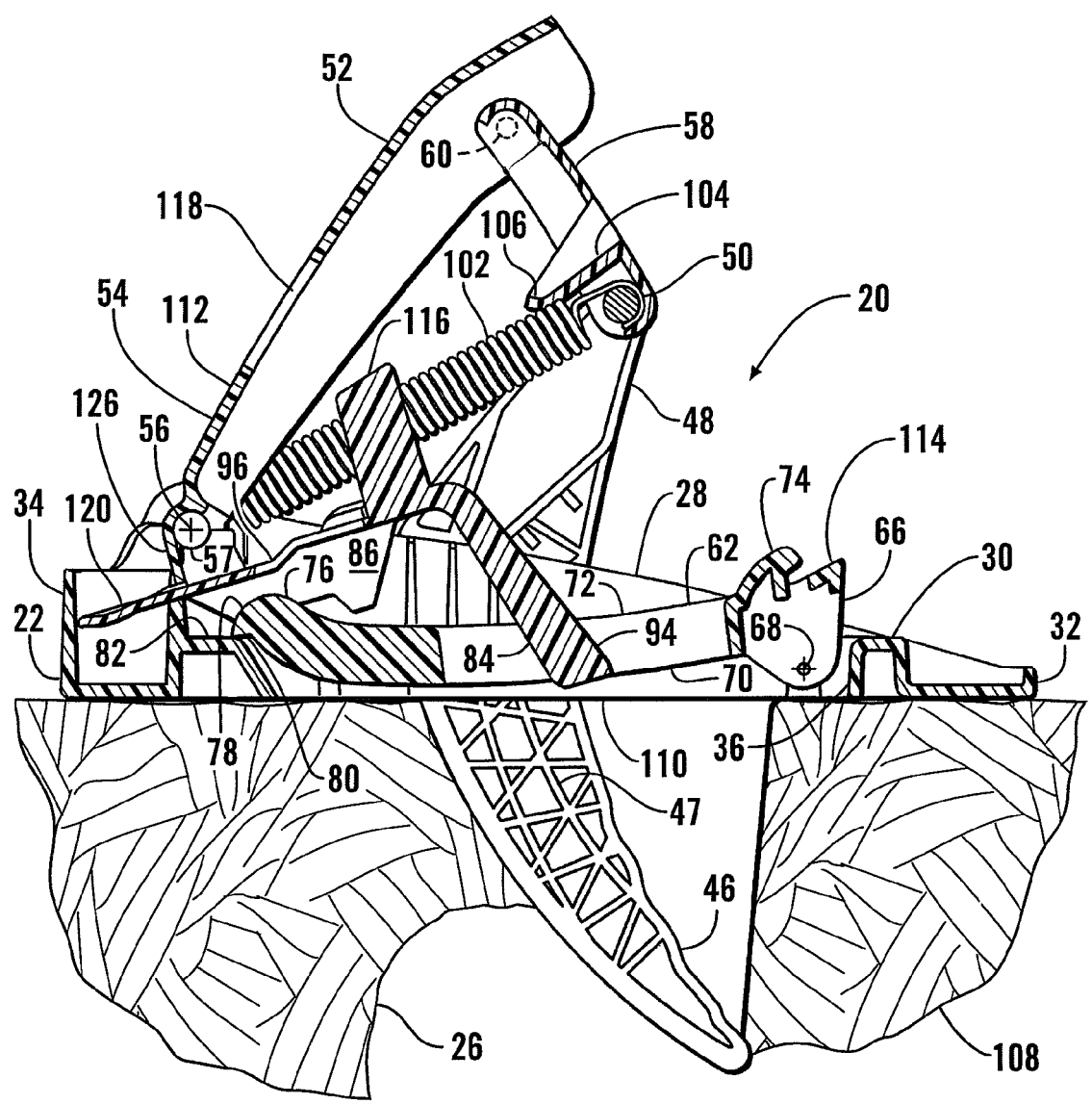
FIG. 3 is a cross-sectional view of the mole trap of FIG. 1, shown in a sprung configuration.
Figure 4:
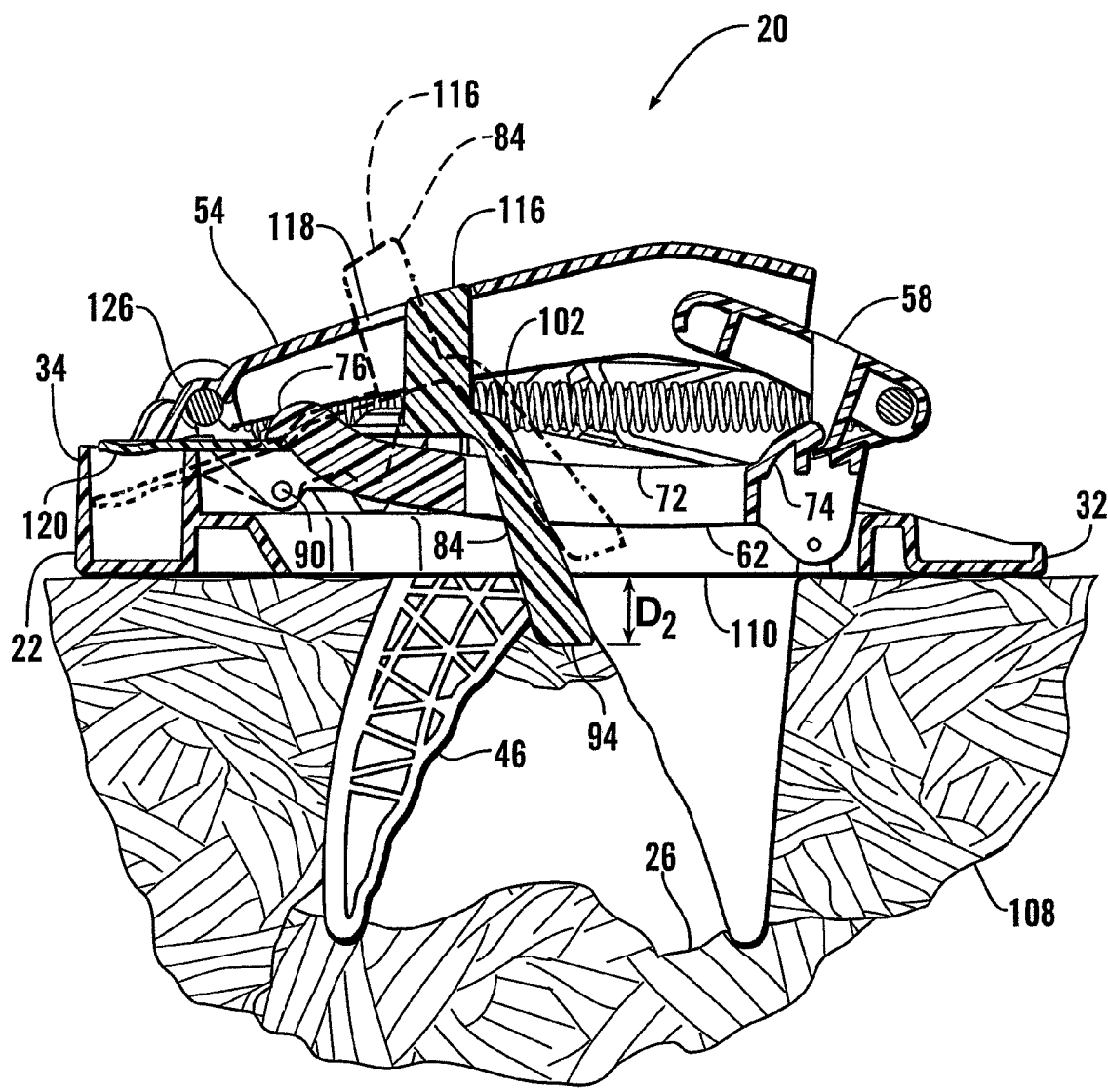
FIG. 4 is a cross-sectional view of the mole trap of FIG. 2 in a set configuration, taken along section line 4-4.

Referring more particularly to FIGS. 1-4, wherein like numbers refer to similar parts, a mole trap 20 is shown. The trap 20 has a plastic base 22 which has a platform 30 configured to be disposed at ground level overlying an underground pest runway 26, such as shown in FIGS. 3 and 4. The base 22 has two side walls 28 which extend upwardly from the horizontal platform 30. A depth gauge 32 protrudes frontwardly from the platform 30, and a release tab shroud 34 extends rearwardly from the platform. A central opening 36 is defined within the platform 30 between the two side walls 28.

A roughly triangular first fixed blade 38 extends downwardly from the base platform 30, so that the blade may be inserted in the soil into or adjacent to the pest runway 26. The first fixed blade 38 may be substantially aligned with one of the side walls 28. A second fixed blade 40 is similar to the first fixed blade 38 and is positioned parallel to it and extending downwardly from the other of the two side walls 28. A longitudinal first direction is defined running from the depth gauge 32 to the release tab shroud 34, and a lateral direction is defined perpendicular to the longitudinal direction. The lateral direction is generally aligned with the direction of the runway 26, such that a mole traversing the runway will enter between the first fixed blade 38 and the second fixed blade 40.

Each of the side walls 28 may be formed as double walls, to receive a pivoting blade therethrough. A first pivoting blade 44 is connected by a fastener 42 to the side wall 28 adjacent the first fixed blade 38, and a second pivoting blade 46 is similarly connected adjacent the second fixed blade 40. The pivoting blades 44, 46 may thus be closed on the fixed blades in a scissors movement, thereby closing upon a mole disposed within its runway. The base 22 with the integrally formed fixed blades, as well as the movable pivoting blades 44, 46 need to be fabricated of a material which is sufficiently strong to be pressed under significant loads into the ground, and yet sufficiently tough that they will not fracture on impact with subterranean rocks, roots, or other obstacles. The plastic parts of the trap, and in particular the base and blades may be fabricated of injection-molded fiberglass-reinforced nylon. The pivoting blades may be provided with an array of stiffening ribs 47. The blades should have adequate torsional stiffness to aid in resisting twisting.

The pivoting blades 44, 46 are connected by the fasteners 42 at a midpoint, and have arms 48 which protrude upwardly above the base 22. The upper ends of the pivoting blade arms 48 are joined by a first transverse rod 50. A lever 52 is comprised of a first lever segment 54 which is pivotably connected to the base 22 about a second axis 56 defined by a second transverse rod 57 and a second lever segment 58 which is pivotably connected to the first transverse rod 50. The first lever segment 54 is pivotably connected to the second lever segment 58 by fasteners 60.

A plastic catch 62 has two sidewardly projecting axles 64 located at a forward end 66 of the catch and which are pivotably mounted to the base 22 so the catch extends within the central opening 36. The catch 62 pivots about a first axis 68 defined by the axles 64. The catch has two side members 70 which extend in the first direction on either side of a central opening 72. A catch pawl 74 extends upwardly from the catch 62 frontwardly of the central opening at the forward end 66, and a trip pawl 76 projects upwardly from the catch at a location spaced rearwardly in the first direction from the catch pawl. The catch pawl 74 is a frontwardly opening hook. While the trip pawl, as shown in FIG. 3, extends in a vertical plane and has a curved upper cam surface 78 and a flat undersurface 80. The catch 62 is prevented from pivoting beneath the base platform 30 by a ledge 82 defined by the platform to the rear of the central opening 36.

A plastic trigger 84 has two downwardly extending legs 86, each of which has a sidewardly protruding stub shaft 88 which is received within an opening in the base 22. The trigger 84 pivots on the shafts about a third axis 90 with respect to the base. The third axis is positioned in the first direction between the first axis and the second axis.

The trigger 84 has a top wall 92 which extends frontwardly, and from which a post 94 extends downwardly through the catch central opening 72 to terminate at a position beneath the catch when the trap is in a set configuration, such as shown in FIG. 4. Portions of the trigger top wall 92 define a slot 96 which extends in the first direction. The slot 96 ends in a pawl-receiving surface 98 positioned rearwardly of the slot. The slot 96 is positioned to receive the catch trip pawl 76 therethrough, and yet is short enough so that the flat under surface 80 of the trip pawl can extend over and be supported on the pawl-receiving surface 98. The trigger post 94 has a horizontal foot 100 which presents a downwardly facing surface which may be pressed upward to pivot the trigger and actuate the trap as described in more detail below.

As best shown in FIG. 2, two springs 102 extend in the first direction from the second transverse rod 57 to the first transverse rod 50. The springs 102 urge the trap into a sprung condition, by pulling the first transverse rod 50 with the attached pivoting blade arms 48 rearwardly. The springs are sufficiently strong as to close the blades with killing force on a mole.

The lever 52 serves to tension the springs 102 and to drive the trap 20 into a set condition in which the fixed and pivoting blades are spaced apart. As best shown in FIGS. 3 and 4, the second lever segment 58 has a downwardly protruding tab 104 which has a rearwardly extending lip 106 which can engage beneath portions of the hook-like catch pawl 74 when the two-part lever 52 is depressed.

The mole trap 20 has a very powerful spring-loaded mechanism, necessary to strike an activating mole with adequate force. This powerful mechanism must be capable of being triggered by a comparatively small force, such as can be produced by a mole, yet the trap should not be so sensitive that minor vibrations or non-directional disturbances would inadvertently set it off. In addition, to provide a level of comfort to the operator, it is desirable that there be no need for the operator to handle the device during its setting or release. Thus the trap 20 can be set in an entirely hands-free manner.

In order to deploy the mole trap 20, a user takes the trap in its sprung condition, such as show in FIG. 3, and, after identifying a subterranean mole runway 26, uses the depth gauge 32 to form a depression in the ground 108 directly above the runway. The depth gauge 32, as shown in FIG. 2, projects frontwardly a distance $D_1$ which is at least as great as the distance $D_2$ which the post protrudes below the underside 110 of the platform 30 of the base 22, as shown in FIG. 4. For example, if the post extends beneath the platform 30 underside by about ¾ inches, then the depth gauge may extend about one inch frontwardly. The sprung trap is then disposed on the ground 108 with the trigger post 94 overlying the depression. The depression provides a place for the post to extend into when the trap 20 is set.

With the trap 20 thus positioned, the user steps firmly on the first lever segment 54, which, as shown in FIG. 3, is shaped somewhat like an automotive accelerator pedal, with an upwardly inclined ramp wall 112. By stepping on the ramp wall 112, the user causes the two segments of the lever 52 to pivot about the fasteners 60 thereby stretching the springs 102 and bringing the second lever segment tab 104 into engagement with a forward wall 114 of the catch which protrudes frontwardly of the catch pawl 74 of the catch 62. When the second lever segment tab 104 contacts the catch 62, the catch pivots upwardly, bringing the trip pawl 76 upwards to contact the underside of the trigger 84 and making the trigger pivot rearwardly about the third axis 90. The curved upper cam surface 78 of the trip pawl 76 helps to raise the trigger until the trip pawl emerges from the trigger slot 96. Once the user has fully depressed the first lever segment 54, the second lever segment tab 104 lip 106 is beneath the catch pawl 74. When the user releases the second lever segment 58, the springs 102 will exert a force seeking to pull the first rod 50 rearwardly, which action will cause the second lever segment tab 104 lip 106 to engage beneath the catch pawl 74, which will tend to pivot the catch rearwardly about the first axis. However, as shown in FIG. 4, the engagement of the trip pawl 76 of the catch 62 on the pawl-receiving surface 98 prevents the catch from pivoting sufficiently to release the hooking engagement between the catch pawl 74 and the second lever segment 58 tab 104. The trap is now effectively set, and it has been brought into this configuration entirely without intervention of the user's hands.

Once in the set configuration, as shown in FIG. 4, the trigger post 94 should extend to its maximum extent beneath the trap platform underside 110. Yet, it may be that the trigger is hung up on some obstruction and has not been fully set, as shown in phantom lines in FIG. 4. The trigger is preferably provided with an upwardly extending trigger set arm 116 which facilitates correction of this condition without the need to move or reset the trap 20. The trigger set arm 116 extends upwardly from the trigger between the slot 96 and the post 94. If the trigger post 94 is not set deeply enough, the set arm 116 will protrude through a narrow slot 118 defined in the overlying lever first segment 54. The user need only depress the trigger set arm 116 by foot to bring the trigger to a proper set configuration. It will be noted that most of the time, when properly depressed, the user's foot will overlie the trigger set arm 116 in the course of setting the trap, and it will automatically be ensured that the trigger is properly set.

A mole advancing along the runway 26 over which the trap 20 is disposed will detect some portion of the runway cavity which has been collapsed by the overhead trap, or will detect the downwardly protruding trigger post itself When the mole urges the trigger or the soil beneath the trigger upwardly, it will pivot the trigger 84 rearwardly. When this happens the pawl-receiving surface of the trigger is removed from its supporting position beneath the trip pawl 76; allowing gravity to work on the catch 62 causing it to pivot and bring the catch pawl 74 rearward and out of engagement with the second lever segment tab 104. Once this happens, the springs 102 are no longer restrained from closing the blades together, and the trap enters into the sprung condition shown in FIG. 3 in which the mole is struck.

At times it is desirable to remove a mole trap 20 from its position in a lawn where it has been disposed and set. The trap should never be transported in a set configuration, so it is desirable to move the trap into a sprung configuration before attempting to move it. The trigger post 94 itself is underground, and is not readily accessible. However, the trigger is preferably provided with a rearwardly extending release tab 120, shown in FIG. 4, which projects into the surrounding release tab shroud 34 of the base 22. The release tab 120 extends outwardly from beneath the lever 52 and is thus readily accessed and depressed by a user without otherwise moving the trap 20. Depressing the release tab 120 has the same effect as urging the trigger post upwardly, and it immediately places the trap 20 into a sprung configuration. Moreover, the position of the release tab, which is readily visible exterior to the lever, serves as an indicator of whether the trigger 84 is properly set or not. If the trigger 84 is set, the trigger release tab 120 will be near the top of the shroud 34, as shown in FIG. 4; if the trigger is not properly set, the trigger release tab will be inclined and recessed within the shroud, as shown in FIG. 3. The trigger release tab may be formed with a recessed dimple 130, as shown in FIG. 1, to indicate to the user a location which may be depressed.

Several low ribs 122 may be disposed on the trigger top wall 92, as shown in FIGS. 1, 2, and 3. The ribs 122 engage with a member 126 which projects from the lever first segment 54. This engagement helps to control the position of the trigger by the location of the lever first segment. When the trap 20 is sprung the lever first segment 54 is tilted back, and the member 126 engages the ribs 122 of the trigger to dispose the trigger in an upwardly inclined position.

It is understood that the invention is not limited to the particular construction and arrangement of parts herein illustrated and described, but embraces all such modified forms thereof as come within the scope of the following claims.

We claim:

1. A mole trap comprising:
    a base having a downwardly extending blade;
    a pivoting blade mounted to the base for pivotable motion with respect to the base blade;
    a catch pivotably mounted about a first axis to the base, the first axis being located at a first end of the base;
    a lever comprised of a first lever segment pivotably connected to a second lever segment, wherein the first lever segment is pivotably mounted to the base, the first lever segment pivoting about a second axis located on the base, wherein the second lever segment is pivotably connected to the pivoting blade, the first axis being spaced from the second axis in a first direction;
    a spring which extends between the second lever segment and the base to urge the pivoting blade to close with the base blade;
    a catch pawl which projects upwardly from the catch;
    a trip pawl which projects upwardly from the catch, the trip pawl being spaced from the catch pawl in the first direction;
    a trigger directly and pivotably mounted to the base about a third axis, the third axis being positioned between the first axis and the second axis;
    portions of the second lever segment that define a downwardly extending tab;
    first portions of the trigger which define a trigger post which extends beneath the catch;
    second portions of the trigger which define a pawl-receiving surface; and
    third portions of the trigger which define a slot extending in the first direction and terminating adjacent the pawl-receiving surface, the slot being positioned to receive the trip pawl extending therethrough, such that when the lever is depressed towards the base, the second lever segment tab engages with the catch pawl, pivoting the catch to engage the trip pawl with the pawl-receiving surface of the trigger and to retain the trap in a set position until such time as the trigger is displaced sufficiently to dislodge the catch pawl from the pawl-receiving surface and thereby allow the spring to urge the pivoting blade towards the base blade into a sprung configuration.

2. The trap of claim 1 wherein the catch has a first side member and a second side member which extend in the first direction to define a central opening therebetween, and wherein the trigger post extends downwardly through the catch central opening.

3. The trap of claim 1 wherein the trigger has a release tab which overlies the base and which extends outwardly from beneath the lever, such that actuation of the release tab causes the trigger to allow the catch to release the lever, thereby placing the trap into the sprung configuration.

4. The trap of claim 1 wherein the trigger has an upwardly extending trigger set arm, and further comprising portions of the first lever segment which define a lever slot configured to allow portions of the trigger set arm to protrude therethrough to permit the trigger to be placed in a deployed set position by urging the trigger set arm downwardly.

5. The trap of claim 1 further comprising a depth gauge which is fixed with respect to and projects from the base in the first direction a distance at least as great as the trigger post extends beneath the base in the set position, the depth gauge being operable to make a depression in a piece of ground over which it is desired to deploy the trap.

6. The mole trap of claim 1 wherein the downwardly extending blade is a fixed part of the base.

7. A mole trap comprising:
    a base;
    a catch pivotably mounted about a first axis to the base, the first axis being located at a first end of the base;

a lever comprised of a plurality of segments, wherein the lever overlies the catch and is movable to engage with the catch in a trap set configuration, and wherein the lever has a first lever segment which is pivotably mounted to the base about a second axis;

at least two blades mounted with respect to the base and arranged to have portions spaced apart to receive a mole therebetween in the set configuration, the lever connected to at least one of the blades;

a spring extending between the base and portions of the lever to urge the lever into a sprung configuration in which the blades are closed upon one another to close upon the mole positioned therebetween;

a trigger directly and pivotably mounted to the base about a third axis, the third axis being positioned between the first axis and the second axis, wherein the trigger extends downwardly from the base in the set configuration, the trigger being arranged with respect to the catch such that displacement of a portion of the trigger causes the catch to be released from the lever, to allow the trap to enter the sprung configuration; and portions of the trigger which define a release tab which overlies the base and which extends outwardly from beneath the lever, such that depression of the release tab causes the trigger to allow the catch to release the lever, thereby placing the trap into the sprung configuration.

8. The trap of claim 7 wherein the catch has a first side member and a second side member which extend in a first direction to define a central opening therebetween, and wherein the trigger has a post which extends downwardly through the catch central opening.

9. The trap of claim 7 further comprising a trigger set arm, and portions of the lever which define a lever slot configured to allow portions of the trigger set arm to protrude upwardly therethrough to permit the trigger to be placed in the deployed set position by urging the trigger set arm downwardly.

10. The trap of claim 7 wherein the trigger has a post which extends downwardly beneath the base, and further comprising a depth gauge which projects frontwardly from the base a distance at least as great as the trigger post extends beneath the base in the set configuration, the depth gauge being operable to make a depression in a piece of ground over which it is desired to deploy the trap.

11. The trap of claim 7 wherein the at least two blades are formed of fiberglass-reinforced nylon.

12. The mole trap of claim 7 wherein one of the at least two blades is a fixed part of the base.

13. A mole trap comprising:
a base;
a catch pivotably mounted about a first axis to the base, the first axis being located at a first end of the base;
a lever comprised of a plurality of segments, wherein the lever overlies the catch and is movable to engage with the catch in a trap set configuration, wherein portions of the lever define a slot, and wherein the lever has a first segment pivotably mounted to the base about a second axis;

at least two blades mounted with respect to the base and arranged to have portions spaced apart to receive a mole therebetween in the set configuration, the lever connected to at least one of the blades;

a spring extending between the base and second portions of the lever to urge the lever into a sprung configuration in which the blades are closed upon one another to close upon the mole positioned therebetween;

a trigger directly and pivotably mounted to the base about a third axis, the third axis being positioned between the first axis and the second axis, and wherein the trigger extends downwardly from the base in the set configuration, the trigger being arranged with respect to the catch such that displacement of a portion of the trigger causes the catch to be released from the lever, to allow the trap to enter the sprung configuration; and portions of the trigger which define an arm which may extend upwardly through the lever slot when the trap is in the set configuration, such that the trigger may be pivoted and depressed into an optimal position in the set configuration by depressing the trigger arm from a position exterior to the lever.

14. The trap of claim 13 wherein the catch has a first side member and a second side member which extend in a first direction to define a central opening therebetween, and wherein the trigger has a post which extends downwardly through the catch central opening.

15. The trap of claim 13 wherein the trigger has a post which extends downwardly beneath the base, and further comprising a depth gauge which projects frontwardly from the base a distance at least as great as the trigger post extends beneath the base in the set configuration, the depth gauge being operable to make a depression in a piece of ground over which it is desired to deploy the trap.

16. The trap of claim 13 wherein the at least two blades are formed of fiberglass-reinforced nylon.

17. The mole trap of claim 13 wherein the one of the at least two blades is a fixed part of the base.

* * * * *